(No Model.) 3 Sheets—Sheet 1.

T. M. WORKMAN.
BALING PRESS.

No. 331,932. Patented Dec. 8, 1885.

WITNESSES
N. W. Mortimer
Josh H. Blackwood

INVENTOR
Thomas M. Workman,
by John Trimble
M. Doolittle
Attorneys (No Model.) 3 Sheets—Sheet 2.

T. M. WORKMAN.
BALING PRESS.

No. 331,932. Patented Dec. 8, 1885.

WITNESSES
W. W. Mortimer.
Jos. H. Blackwood.

INVENTOR
Thomas M. Workman,
by John Trimble
W. H. Doolittle
Attorneys (No Model.)
3 Sheets—Sheet 3.
T. M. WORKMAN.
BALING PRESS.
No. 331,932. Patented Dec. 8, 1885.
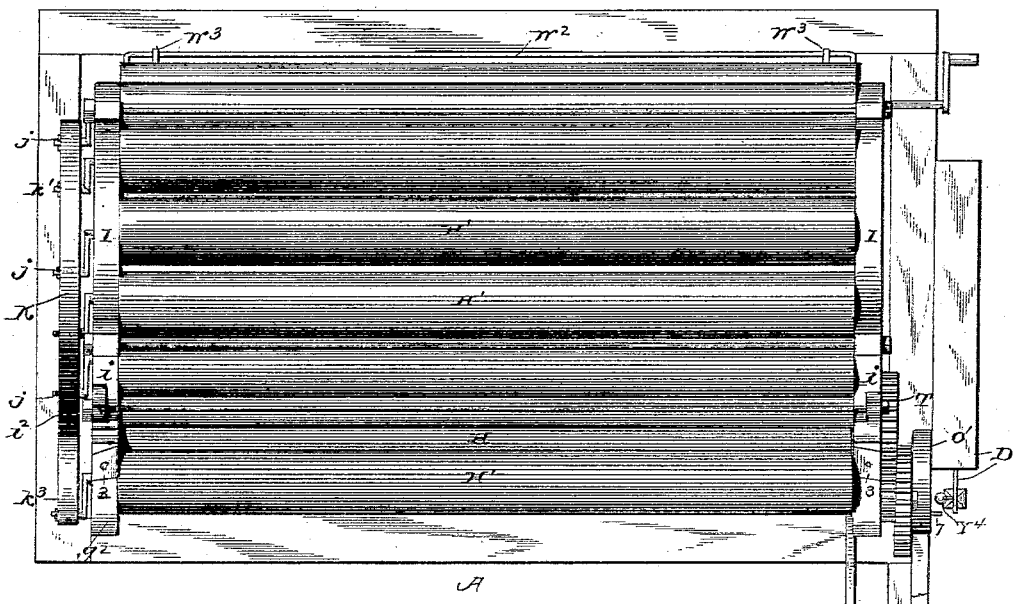
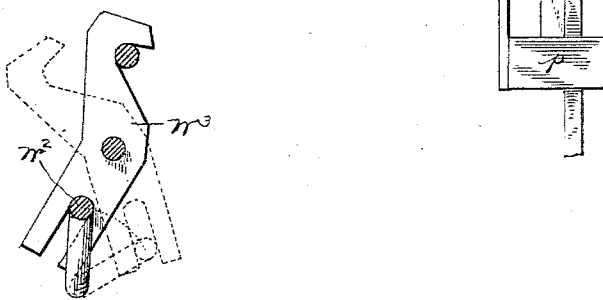
WITNESSES
W. W. Mortimer
Jos. H. Blackwood
INVENTOR
Thomas M. Workman
by John Trimble
M. Doolittle,
Attorneys

UNITED STATES PATENT OFFICE.

THOMAS M. WORKMAN, OF CLINTON, SOUTH CAROLINA, ASSIGNOR OF ONE-HALF TO JOSEPH A. BAILEY, OF SAME PLACE.

BALING-PRESS.

SPECIFICATION forming part of Letters Patent No. 331,932, dated December 8, 1885.

Application filed June 4, 1885. Serial No. 167,618. (No model.)

*To all whom it may concern:*

Be it known that I, THOMAS M. WORKMAN, a citizen of the United States, residing at Clinton, in the county of Laurens and State of South Carolina, have invented certain new and useful Improvements in Baling-Presses; and I do hereby declare the following to be a full, clear, and exact description of the invention, such as will enable others skilled in the art to which it appertains to make and use the same.

My invention relates to a baling-press in which rollers are placed in a circle to form a hollow cylinder for the reception of material to be pressed.

Heretofore roller-presses for pressing cotton have been constructed in which the rollers have been made to approach and recede from each other, so that the cotton is rolled upon itself in successive layers until the required quantity has been accumulated. By my improvement the rollers are held on a fixed circumference, by the operation of which when cotton, hay, or the material to be pressed is fed to the cylinder it is gradually pressed and crushed to the center until a solid compact bale is produced. I have also improved the means for feeding the cotton into the cylinder, for retaining the material within the cylinder, for making the ends of the round bale flat and solid, and for ejecting the bale when finally formed and tied, and have combined in a novel manner my improved press with an ordinary platform weighing-scale, whereby a bale of any predetermined weight may be produced.

By my improvements a light, convenient, and portable press is obtained, which operates on the material to form a bale continuously and automatically, and by which a bale of any weight and of a most convenient form is produced.

Figure 1:
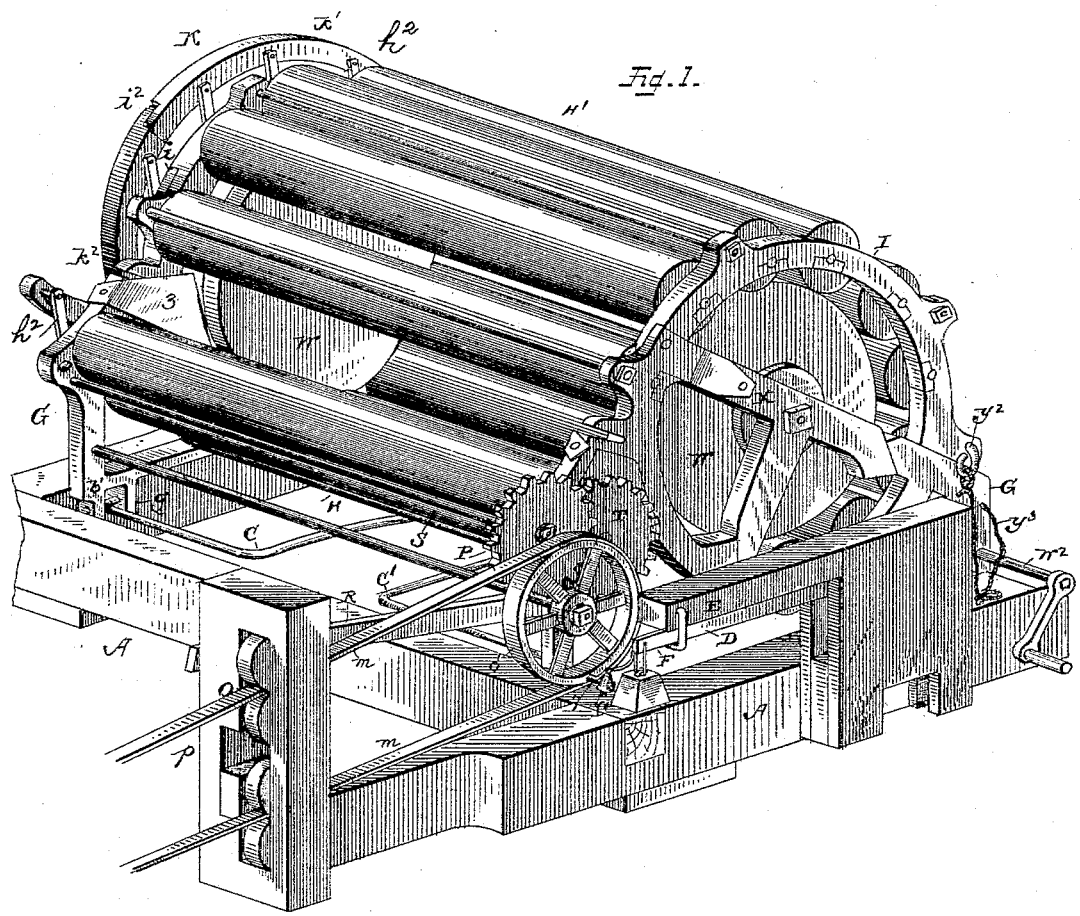
Figure 5:
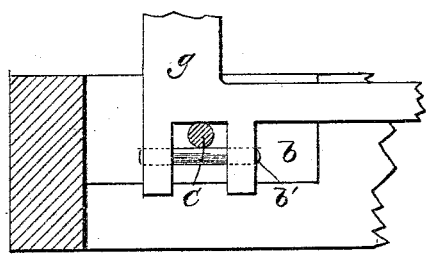
Figure 2:
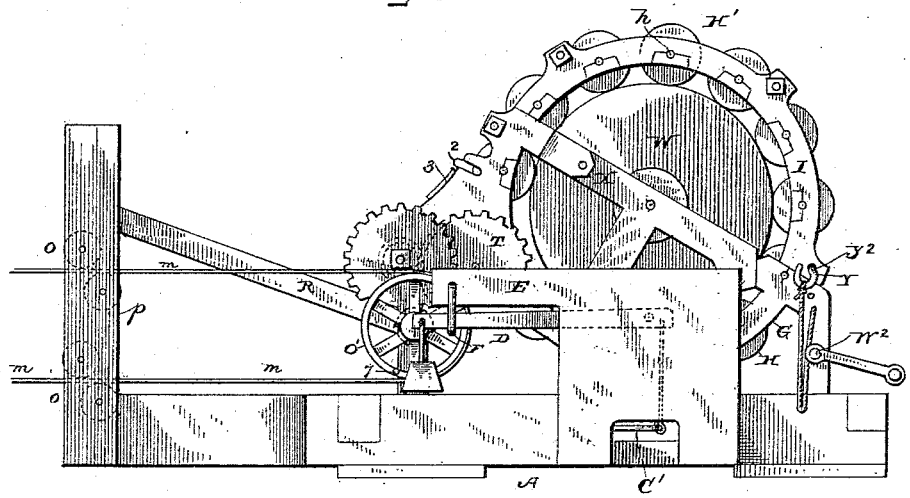
Figure 3:
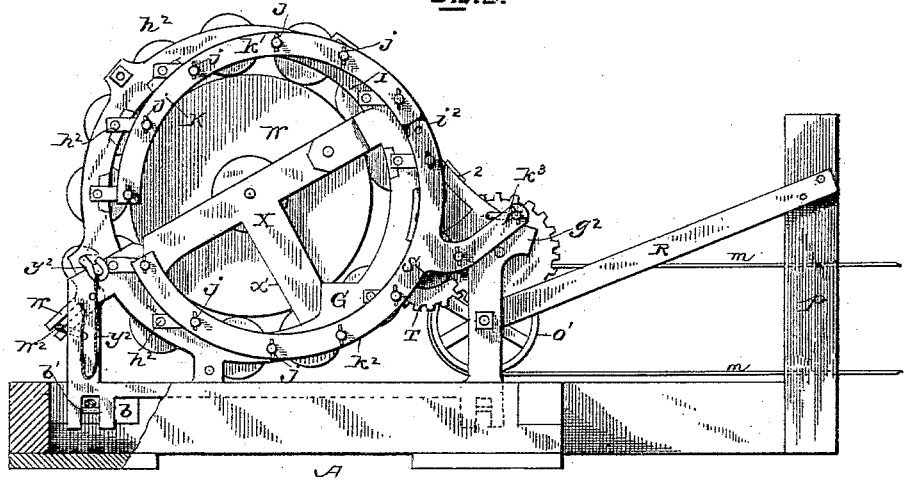

My invention is illustrated in the accompanying drawings, in which Figure 1 is a perspective view; Figs. 2 and 3, side elevations; Fig. 4 a plan, and Figs. 5 and 6 detail views.

The machine is designed to rest on a platform-scale of which A is the bed-frame. The frame is provided at each inner corner with a plate, $b$, in which rest the ends of upper and lower levers, $c$ $c'$. The upper lever crosses and rests upon the lower one, $c'$, at the center, and the latter is hung on the rod connected to the scale-beam. The upper part of the scale is of the usual form, and provided with a scale-beam, D, the knife-edge of which rests in an arm depending from a lever, E, and this lever and the scale-beam are connected by a loop, F. To the scale-beam are connected weights and a bell, the latter being rung when the scale-beam rises, to give notice when the bale has reached the required weight.

G represents the frame of the lower half of the baling-press and is provided with divided legs $g$. These legs rest upon the levers $c$ and $c'$, and are provided with short rods $b'$, which serve to hold the legs in place on the levers, as shown.

H H' are the rollers which constitute the cylinder in which are pressed the cotton, hay, or other material. They are divided into two sections. The former set, H, are denominated "feed-rolls," and while all are mounted on crank-rods $h^2$ the feed-rolls H have their bearings in the stationary part of the frame G, while the upper section of rolls H' are mounted on segments I I, which are hinged to the lower part, G, at $i$. The upper section of rollers constitute the cover of the press, which may be lifted when the bale is to be ejected at the rear of the press, as hereinafter described.

K is a circular crank-lever in two parts, $k'$ $k^2$, hinged together at $i^2$, corresponding in form and to the point of hinging with the segments I I, pivoted to G, as above described. The crank ends of roller-rods $h^2$ have their bearings in the crank-lever K, and the two parts of the lever K are held in place on the cranks by means of pins or keys $j$. The rolls are driven by gearing P by means of a belt, $m$, passing between the double set of pulleys O O, mounted in standard $p$, made fast to the frame A, to pulley O', next to the gearing. The object of employing a double set of pulleys is to maintain and guide the belt at all times in a horizontal position in order that in the process of weighing as the press rises and falls the pulling strain of the belt shall not add to or subtract from the weight of the bale. In order also to counteract the pulling tendency of the belt upon the bale at this time, a horizontal brace, R, is employed, pivoted at one end to the standard and at the other end to the press-frame, as shown. Thus the press is free to rise and fall as the bale increases in weight or after it is ejected. If a driving-pulley be employed which is of the same size as the driven pulley O', and placed so as to deliver the belt in a precisely horizontal direction, the four small guide-pulleys may be dispensed with.

S is the particular roll among the feed-rolls from which all the rolls receive motion in the same direction from crank-lever K. One end of the shaft of the roll S carries the cog T in the gearing P, and the other, the crank end, connects with part $k^2$ of the crank-lever K. The circular crank-lever K thus receives, through the cranks $h^2$, a slightly circular and reciprocating motion. The object of the crank-lever K in its mode of construction and operation is also to give the rollers a continuous rotary motion when the same are separated either by lifting the cover or otherwise. Two of the rollers (or it may be more) in front of the machine are projected forward or set out on arms $g^2$ and $k^3$ from G and K, as shown, beyond the others, to form a sort of hopper or receptacle between the upper and lower sections of the rolls, into which the material is fed to the machine. Cotton being fed at this point to the press passes into the cylinder formed by the rolls, first forming an outer layer; but this layer and the succeeding ones as the material continues to be fed is forced or crushed to the center from the circumference.

To give a bale flat solid ends, I employ at each end of the cylinder a circular plate, W, which is pivoted to a central support, X. These plates are revolved by being allowed to come in contact with the rolls. The supports X for the revolving plates may be secured to the frame-work by a hinged arm, $x'$, so as to swing outward, in order that the ends of the press may be opened when desired. At the entrance of the press a feed-board, 2, is added, to prevent cotton being thrown back by the roll above the mouth of the press, and guides 3 3 are attached to the frame and extended back to the circular plates, to prevent the material from being thrown behind the same.

$W^2$ is a crank-rod on the rear of the machine, provided at each end with a notched latch, $w^3$, adapted to engage with a rod, Y, passing across the press from I to I, for the purpose of keeping the cover closed. When the bale is formed, by turning the crank-rod $w^2$ both latches are disengaged at once, the cover is free to rise, and the bale is ejected. Before the bale is ejected, however, the bagging and ties may be fed to the press through the same opening between the rolls in which the material is fed thereto, and buckles, when employed, may be fastened at the same opening. The rod Y is provided at its opposite ends with loops $y^2$, to which cords $y^3$ may be attached, and secured to the frame G, to prevent the cover from being thrown too far open, so as to prevent injury to the press when the bale is ejected.

$Y^4$ is the bell suspended from the scale-beam and part of the counterpoise used to balance the weight of the press. When the scale-beam rises and the bale reaches the desired weight, the bell comes in contact with a pin, 7, on the belt-pulley O', and is thereby rung.

When used as a cotton-press, the cotton is fed directly into the press from the condenser. As the cotton is carried around within the press, it at once assumes the form of a roll, and its weight adds to the force by which the cotton is pressed and crushed upon itself.

It will be seen that the action of the press is automatic.

Having thus described my invention, what I claim is—

1. A baling-press composed of sections of rollers forming a cylindrical receptacle for the material to be pressed, the said sections hinged together, whereby the cylinder is adapted to be opened and the rollers maintained in the same circumferential line during the process of pressing, substantially as described.

2. In a baling-press of the character described, the rollers arranged in sections and mounted on crank-shafts, in combination with the circular crank-lever divided into segments and hinged together, and the driving mechanism whereby all the rolls are rotated simultaneously when the press is either open or closed, substantially as described.

3. The rollers arranged in a circle to form a cylinder for the reception of the material to be compressed, in combination with the mechanism for revolving the rollers, and the revolving circular plates within said cylinder to form the flat ends of the bales, substantially as described.

4. In a press of the character described, comprising rollers forming a cylindrical receptacle for the material to be pressed, the rollers at one end set out beyond the others to form the mouth or opening into which the material is fed, and wherein bagging and ties are introduced for completing the bale, substantially as described.

5. A baling-press provided with rollers arranged in a circle to form a cylinder within and by which the material is compressed, and having the lower frame, G, provided with legs, in combination with the levers of an ordinary platform-scale, on which the legs of said frame G rest, substantially as and for the purpose described.

6. The combination, with the frame of the press, of the crank-rod carrying the latches, and the upper hinged part, whereby the press is held closed when necessary, substantially as described.

7. The baling-press herein described, comprising the rollers H and their supports, the jointed circular crank-lever J, and the crank-rods on which the rollers are mounted, in combination with the gearing and the crank-rod of one of the rollers, whereby all the rollers and the said crank-lever are given their motion from said crank-rod, substantially as described.

8. The combination, with the baling-press, of the driving-belt and pulleys, and the horizontal pivoted brace, whereby the belt is guided and maintained in a horizontal position and undue pulling strain on the press is prevented during the operation of weighing, substantially as described.

9. In combination with the press, a weighing-scale, the scale-beam of which is provided with a bell and the driven pulley O', provided with a pin, whereby, when the bale obtains the required weight, the beam is raised, the bell brought against said pin, and the signal given, substantially as described.

10. The baling-press herein described, comprising, in combination, the platform-scale on which the press is supported, the rollers H, constituting the cylinder, the frame G, the segments I, and the jointed circular crank-lever J, for supporting and driving the rolls, the hinged circular revolving plates for forming the heads of the bales, the guides for preventing the material from passing back of the said plates, the latch device for closing the cylinder, and the mechanism for driving the press, substantially as described.

In testimony whereof I affix my signature in presence of two witnesses.

THOMAS M. WORKMAN.

Witnesses:
R. L. BAILEY,
J. M. BLAKELY.